United States Patent
Kaneura et al.

(10) Patent No.: US 6,578,771 B2
(45) Date of Patent: Jun. 17, 2003

(54) VEHICLE AIR CONDITIONER WITH FRONT AIR PASSAGE AND REAR AIR PASSAGE

(75) Inventors: Shinya Kaneura, Kariya (JP); Hitoshi Kondo, Kariya (JO); Tomohide Shindo, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/059,930

(22) Filed: Jan. 28, 2002

(65) Prior Publication Data

US 2002/0121557 A1 Sep. 5, 2002

(30) Foreign Application Priority Data

Mar. 1, 2001 (JP) .......... 2001-057252

(51) Int. Cl.[7] .............................. B60H 1/02
(52) U.S. Cl. ............ 237/12.3 B; 237/2 A; 165/42
(58) Field of Search .................. 454/121, 160, 454/126, 144, 156; 165/42, 43, 204; 237/12.3 B, 12.3 R

(56) References Cited

U.S. PATENT DOCUMENTS

| | | | | |
|---|---|---|---|---|
| 4,762,169 A | * | 8/1988 | Andersen et al. ........... 165/203 |
| 5,181,553 A | * | 1/1993 | Doi .............................. 165/203 |
| 5,195,574 A | * | 3/1993 | Tanaka et al. ............... 165/203 |
| 5,971,287 A | * | 10/1999 | Kettner et al. ............. 236/44 A |
| 6,019,288 A | * | 2/2000 | Arold et al. .................... 236/13 |
| 6,048,263 A | * | 4/2000 | Uchida et al. .............. 454/121 |
| 6,145,754 A | * | 11/2000 | Uemura et al. ......... 237/12.3 A |

* cited by examiner

Primary Examiner—Derek Boles
(74) Attorney, Agent, or Firm—Harness, Dickey & Pierce, PLC

(57) ABSTRACT

In a vehicle air conditioner, an air conditioning case has a front air passage and a rear air passage through which air is blown to a front seat side and a rear seat side in a passenger compartment, respectively. The air conditioner includes an air-blowing amount determination unit for determining an air-blowing amount of a blower, and a correction unit for increasing the air-blowing amount determined by the determination unit when the rear air passage is opened. The correction unit increases an increase amount of the air-blowing amount to be larger in a face mode, than that in a bi-level mode.

18 Claims, 8 Drawing Sheets

VEHICLE AIR CONDITIONER WITH FRONT AIR PASSAGE AND REAR AIR PASSAGE

CROSS-REFERENCE TO RELATED APPLICATION

This application is related to and claims priority from Japanese Patent Application No. 2001-57252 filed on Mar. 1, 2001, the content of which are hereby incorporated by reference.

BACKGROUND OF THE INVENTION

1. Field of the Invention

The present invention relates to a vehicle air conditioner having a single air-conditioning unit for performing air-conditioning operation for both of a front seat side and a rear seat side in a passenger compartment.

2. Description of Related Art

In a conventional vehicle air conditioner disclosed in U.S. Pat. No. 5,086,628, a single air-conditioning unit performs air-condition operation for both sides of a front seat and a rear seat in a passenger compartment. In this air-conditioning unit, an air passage is divided into a front air passage and a rear air passage at a downstream air side of a cooling heat exchanger, so that air is blown to the front seat side through the front air passage, and air is blown to the rear seat side through the rear air passage. Further, an opening/closing door is provided in the rear air passage, and air blown to the rear seat side is switched by the opening/closing door. When the opening/closing door is opened so that air is blown to the rear seat side, an air-blowing amount of the air-conditioning unit is increased.

However, a specific control for increasing the air amount is not disclosed in the above air conditioner. Because a comfortable amount of air blown into the passenger compartment is changed in accordance with a condition of the air conditioner, an amenity in the passenger compartment is worsened when an increased rate of the air-blowing amount is not suitably controlled.

SUMMARY OF THE INVENTION

In view of the foregoing problems, it is an object of the present invention to provide a vehicle air conditioner with a front air passage and a rear air passage, which suitably controls an increase amount of an air-blowing amount while air is blown to a rear seat side of a passenger compartment through the rear air passage, so that an amenity in the passenger compartment is improved.

According to the present invention, a vehicle air conditioner includes a blower for blowing air into the passenger compartment through the front air passage and the rear air passage, an air-amount adjustment unit for adjusting an amount of air blown at least toward the upper side of the front seat in the passenger compartment, an opening/closing unit for opening and closing the rear air passage, air-amount determination means for determining an air-blowing amount of the blower, and air-amount correction means for increasing the air-blowing amount determined by the air-amount determination means when the rear air passage is opened by the opening/closing unit. In the vehicle air conditioner, the air-amount correction means sets an increase amount of the air-blowing amount, determined by the air-amount determination means, to be larger when the amount of air blown to the upper side of the front seat is larger than a predetermined amount, than that when the amount of air blown to the upper side of the front seat is smaller than the predetermined amount. Generally, a passenger is readily sensed when an air amount blown to the upper side of the passenger is changed, as compared with a case where an air amount blown to the lower side of the passenger is changed. In the present invention, because the increase amount of the air-blowing amount of the blower is suitably controlled according to the amount of air blown to the upper side of the passenger on the front seat, the amenity of the passenger on the front seat can be maintained even when air is blown to the rear seat side.

Preferably, in a face mode where air is blown from a face opening of the front air passage, the amount of air blown toward the upper side of the front seat is larger than the predetermined amount. On the other hand, in a bi-level mode where air is blown from both of the front face opening and the front foot opening, the amount of air blown toward the front seat is smaller than the predetermined amount. Accordingly, the increase amount of the air-blowing amount can be increased in the face mode.

When the air outlet mode is automatically set based on a target temperature of air blown toward the front seat in the passenger compartment, the face mode is set when the target temperature is lower than a first predetermined temperature, a foot mode is set when the target temperature is higher than a second predetermined temperature higher than the first predetermined temperature, and the bi-level mode is set when the target temperature is in an area between the first predetermined temperature and the second predetermined temperature. Accordingly, while air is blown toward the rear seat, the air amount can be increased in the face mode and in the foot mode.

Alternatively, when the air outlet mode is manually set by a passenger in the passenger compartment, the air-amount correction means sets the increase amount of the air-blowing amount at a small value in the foot mode, sets the increase amount of the air-blowing amount at a middle value larger than the small value in the bi-level mode, and sets the increase amount of the air-blowing amount at a large value larger than the middle value in the face mode. Therefore, while air is blown toward the rear seat in the passenger compartment, the air amount can be suitably increased in accordance with the manually-set air outlet mode.

Further, the vehicle air conditioner includes an air mixing door for adjusting a ratio between an air amount passing through a heating heat exchanger and an air amount bypassing the heating heat exchanger, and door open-degree determination means for increasing an open degree of the air mixing door as the target temperature increases. The air-amount correction means increases the increase amount the air-blowing amount, determined by the air-amount determination means, larger in a small open-degree area and a large open-degree area of the air mixing door, than that in a middle open-degree area between the small open-degree area and the large open-degree area. Thus, the air amount can be suitably increased in accordance with the open degree of the air mixing door, while air is blown toward the rear seat in the passenger compartment.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Figure 1:
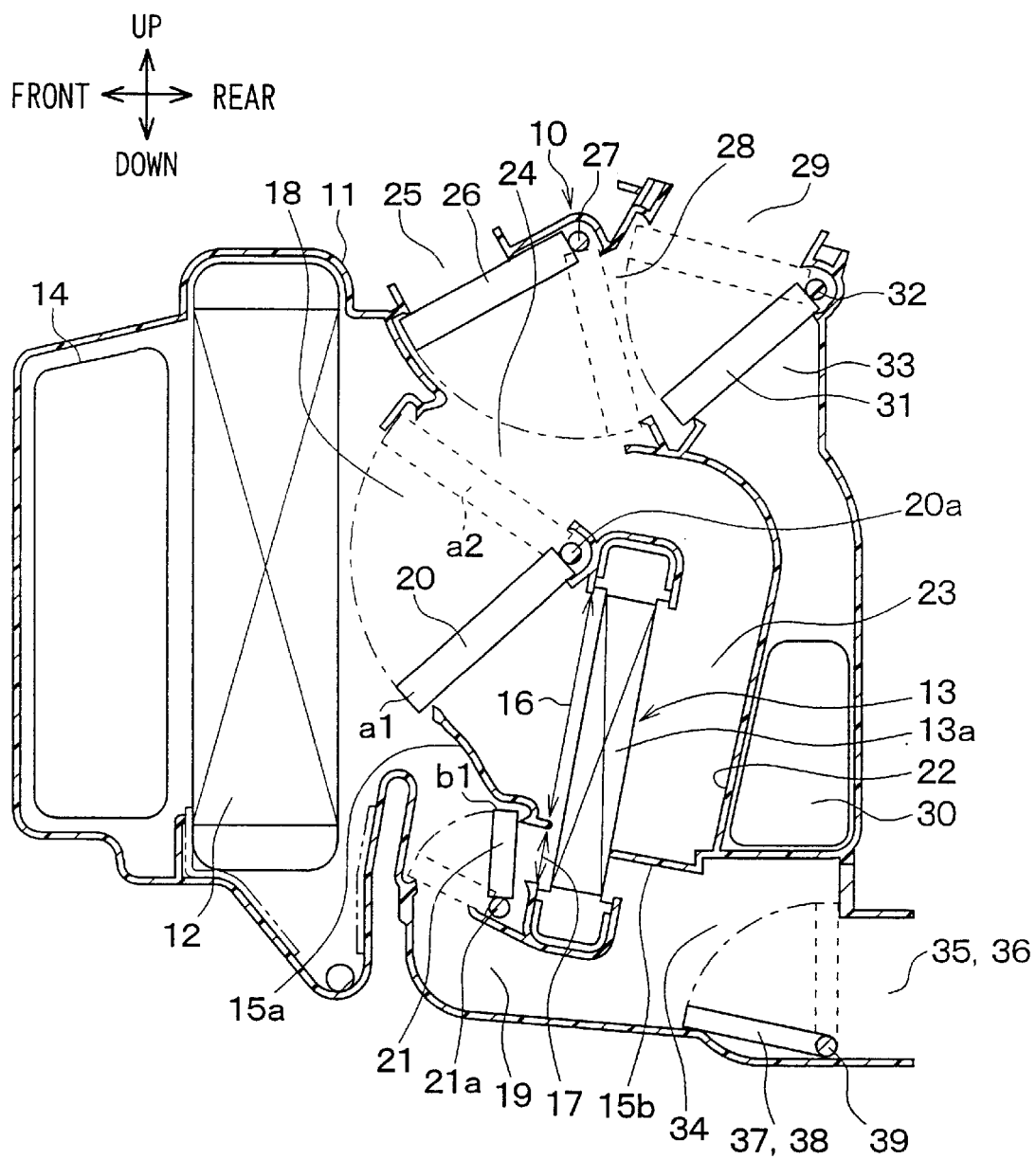
FIG. 1 is a longitudinal sectional view showing an air-conditioning unit of a vehicle air conditioner according to a first preferred embodiment of the present invention.

Preferred embodiments of the present invention will be described hereinafter with reference to the accompanying drawings.

A first preferred embodiment of the present invention will be now described with reference to FIGS. 1–6. In a vehicle air conditioner according to the first embodiment, a ventilation system includes an air-conditioning unit 10 shown in FIG. 1, and a blower unit 1 (see FIG. 2) for blowing air into the air-conditioning unit 10.

The blower unit 1 is disposed in a passenger compartment below an instrument panel (not shown) to be offset from a center portion to a front-passenger's seat side in a vehicle right-left direction (width direction). The blower unit 1 includes an inside/outside air switching box 2. The inside/outside air switching box 2 has an outside air suction port 3, an inside air suction port 4, and an inside/outside switching door (switching door) 5 for selectively opening and closing the suction ports 3, 4. Outside air (air outside the passenger compartment) is sucked into the inside/outside air switching box 2 through the outside air suction port 3, and inside air (air inside the passenger compartment) is sucked into the inside/outside air switching box 2 through the inside air suction port 3. A blower 6, for blowing air sucked through the switching box 2, is disposed under the inside/outside air switching box 2. The blower 6 includes a centrifugal blower fan 7, a scroll case 8 for containing the blower fan 7, and a motor 9 for driving the blower fan 7.

The air-conditioning unit 10 includes a resinous air-conditioning case 11, an evaporator (cooling heat exchanger) 12 and a heater core (heating heat exchanger) 13. The evaporator 12 and the heater core 13 are disposed in the air-conditioning case 11. The air-conditioning unit 10 is disposed in the passenger compartment below the instrument panel while being arranged substantially at the center portion in the vehicle right-left direction. Further, the air-conditioning unit 10 is mounted on a vehicle to correspond to the arrangement shown in FIG. 1 in a vehicle front-rear direction and a vehicle up-down direction.

An air inlet 14 is provided in the air-conditioning case 11 at the most front side surface. Air, blown from an outlet of the scroll case 8 of the blower unit 1, flows into the air conditioning case 11 through the air inlet 14.

The evaporator 12 for cooling air is disposed in the air-conditioning case 11 at an immediately downstream side of the air inlet 14. The evaporator 12 cools air passing therethrough, by absorbing evaporation latent heat of refrigerant in a refrigerant cycle system from air. Further, the evaporator 12 is disposed substantially vertically to cross an entire air passage within the air-conditioning case 11, while the thickness of the evaporator 12 is thin in the vehicle front-rear direction.

The heater core 13 is disposed at a downstream air side (vehicle rear side) of the evaporator 12 to have a predetermined distance between the heater core 13 and the evaporator 12. Further, the heater core 13 is disposed in the air-conditioning case 13 at a lower side to be slightly slanted toward the vehicle rear side. The heater core 13, in which hot water (engine-cooling water) flows, heats air flowing from the evaporator 12, using the hot water as a heat source. The heater core 13 includes a heat-exchanging core portion 13a composed of flat tubes in which the hot water flows and corrugate fins connected to the flat tubes. An air passage passing through the heat exchanger core 13a is partitioned into a front passage 16 at an upper side, and a rear passage 17 at a lower side, by first and second partition members 15a, 15b. The first and second partition members 15a, 15b are disposed at upstream and downstream air sides of the heater core 13, respectively. Further, the first and second partition members 15a, 15b are provided so as to extend an entire length within an inner space of the air-conditioning case 11 in the vehicle right-left direction. The first and second partition members 15a, 15b may be provided to be separated from the air-conditioning case 11, or may be provided to be integrated with the air-conditioning case 11.

In the air passage within the air-conditioning case 11, a front cool-air bypass passage 18 and a rear cool-air bypass passage 19 are provided at an upper side of the heater core 13 and an lower side thereof, respectively. In the front cool-air bypass passage 18 and the rear cool-air bypass passage 19, cool air having passed through the evaporator 12 flows while bypassing the heater core 13.

A front air-mixing door 20 and a rear air-mixing door 21 are rotatably disposed between the evaporator 12 and the heater core 13, respectively. The front air-mixing door 20 adjusts a ratio between an air amount heated by the heater core 13 in the front core passage 16, and an air amount flowing through the front cool-air bypass passage 18 while bypassing the heater core 13. The rear air-mixing door 21 adjusts a ratio between an air amount heated by the heater core 13 in the rear core passage 17, and an air amount flowing through the rear cool-air bypass passage 19 while bypassing the heater core 13.

Both the air-mixing doors 20, 21 are integrally connected to rotation shafts 20a, 21a, respectively, to be independently rotated around the rotation shafts 20a, 21a in the vehicle up-down direction, respectively. That is, the temperature of air to be blown to the front seat side in the passenger compartment can be independently adjusted by the front air-mixing door 20, and the temperature of air blown to the rear seat side can be independently adjusted by the rear air-mixing door 21.

The rotation shafts 20a, 21a are rotatably supported in the air-conditioning case 11, respectively. Each end of both shafts 20a, 21a protrudes outside the air-conditioning case 11, and is connected to an independent actuator mechanism through a link mechanism (not shown). Thus, each rotation position of both the air-mixing doors 20, 21 can be independently adjusted.

A wall portion 22, which extends in the vehicle up-down direction, is integrally formed with the air-conditioning case 11 at a downstream air side position of the heater core 13 to be spaced from the heater core 13 by a predetermined distance in the air-conditioning case 11. A lower end of the wall portion 22 is connected to a rear end of the second partition member 15b. The second partition member 15b and the wall portion 22 are disposed to define a front warm air passage 23 in which warm air flows upward from the immediately rear side of the heater core 13. A downstream side (upper side) of the front warm air passage 23 is joined with the front cool-air bypass passage 18 at the downstream air side, in a front air-mixing space 24 provided above the heater core 13. In the front air-mixing space 24, cool air from the front cool-air bypass passage 18 and warm air from the front warm air passage 23 are mixed with each other to have a predetermined temperature.

A defroster opening 25 is opened in an upper surface of the air-conditioning case 11 at a position adjacent to the front air-mixing space 24. Conditioned air from the front air-mixing space 24, flows into the defroster opening 25. The defroster opening 25 is connected to a defroster air port through a defroster duct (not shown), so that the conditioned air is blown from the defroster air port toward an inner surface of a vehicle windshield. The defroster opening 25 is opened and closed by a plate-like defroster door 26 rotatable around a rotation shaft 27. The rotation shaft 27 is disposed at a position proximate to the upper surface of the air-conditioning case 11. The defroster door 26 is disposed to selectively open and close the defroster opening 25 and a communication port 28. Through the communication port 28, the conditioned air flows from the front air-mixing space 24 toward a front face opening 29 and a front foot opening 30.

The front face opening 29 is provided in the upper surface of the air-conditioning case 11 at a vehicle rear side of the defroster opening 25. The front face opening 29 is connected to a front face air port provided above the instrument panel through a face duct (not shown), so that the conditioned air is blown from the front face air port toward the upper half body of a passenger on the front seat in the passenger compartment.

The front foot opening 30 is opened in the right and left side surfaces of the air-conditioning case 11 at a lower side position of the front face opening 29. Therefore, conditioned air is blown from the front foot opening 30 toward the foot areas of a driver's seat and a front-passenger's seat.

A plate-like front foot/face switching door 31, rotatable around a rotation shaft 32, is disposed between the front face opening 29 and the front foot opening 30. The front face opening 29 and the front foot opening 30 are opened and closed by the front foot/face switching door 31. The defroster door 26 and the front foot/face switching door 31 are connected to a common actuator mechanism including a servomotor, through a link mechanism (not shown). Therefore, the defroster door 26 and the front foot/face switching door 31 are operatively linked with each other by the common actuator mechanism.

On the other hand, in a rear air-mixing space 34, warm air heated by the heat-exchanging core portion 13a of the heater core 13 in the rear core passage 17 is mixed with cool air passing through the rear cool-air bypass passage 19 while bypassing the heater core 13. Thus, air having a predetermined temperature desired by the passenger is obtained in the rear air-mixing space 34. A rear face opening 35 (Rr FACE) and a rear foot opening 36 (Rr FOOT) are provided at downstream sides of the rear air-mixing space 34. In the first embodiment, as schematically shown in FIG. 2, the rear face opening 35 is disposed at a rear lower end of the air-conditioning case 11 at a center portion in the vehicle right-left direction (in a face-back in the paper of FIG. 1). The rear foot opening 36 is disposed at both right and left sides of the rear face opening 35.

A rear face door 37 and rear foot doors 38 are disposed to be rotatable around a single rotation shaft 39. The rear face door 37 is disposed in the rear face opening 35 located at the center portion. The rear foot doors 38 are disposed in the rear foot openings 36 located at both right and left sides of the rear face opening 35. The plural rear doors 37, 38 (e.g., three) are connected to the single rotation shaft 39 extending in the vehicle right-left direction to be operatively linked with each other. Each of the plural rear doors 37, 38 is attached to the single rotation shaft 39 so that its attachment angle is suitably set in the rotational direction around the rotation shaft 39. Thus, any one of rear air outlet modes can be selected by changing the rotation angle of the single rotation shaft 39. Here, the rear air outlet modes include a rear face mode where only the rear face opening 35 is opened, a rear foot mode where only the rear foot openings 36 are opened, a rear bi-level mode where both of the rear face opening 35 and the rear foot opening 36 are opened, and a rear shutting mode where all the rear face opening 35 and the rear foot opening 36 are closed.

The rear face opening 35 is communicated with a rear face air outlet through a duct, so that conditioned air is blown to the upper half body of a passenger on the rear seat from a rear face air outlet. Similarly, each of the rear foot openings 36 is communicated with a rear foot air outlet through a duct so that conditioned air is blown to the foot area of the passenger on the rear seat from the rear foot air outlet.

The rotation shaft 39 of the rear doors 37, 38 is rotatably supported in the air-conditioning case 11, and one end of the rotation shaft 39 protrudes outside the air-conditioning case 11. The protruded end of the rotation shaft 39 is connected to an independent actuator mechanism using a servomotor, through a link mechanism (not shown), so that operation positions of the rear doors 37, 38 are changed by the actuator mechanism.

In the first embodiment, as shown in FIG. 2, a front air passage 100, through which air is introduced toward the front seat side of the passenger compartment, is formed by the front core passage 16, the front cool-air bypass passage 18, the front warm air passage 23, the front air-mixing space 24, the communication port 28 and the like. Further, a rear air passage 200, through which air is introduced into the rear seat side of the passenger compartment is formed by the rear core passage 17, the rear cool-air bypass passage 19, the rear air-mixing space 34 and the like.

Figure 3:
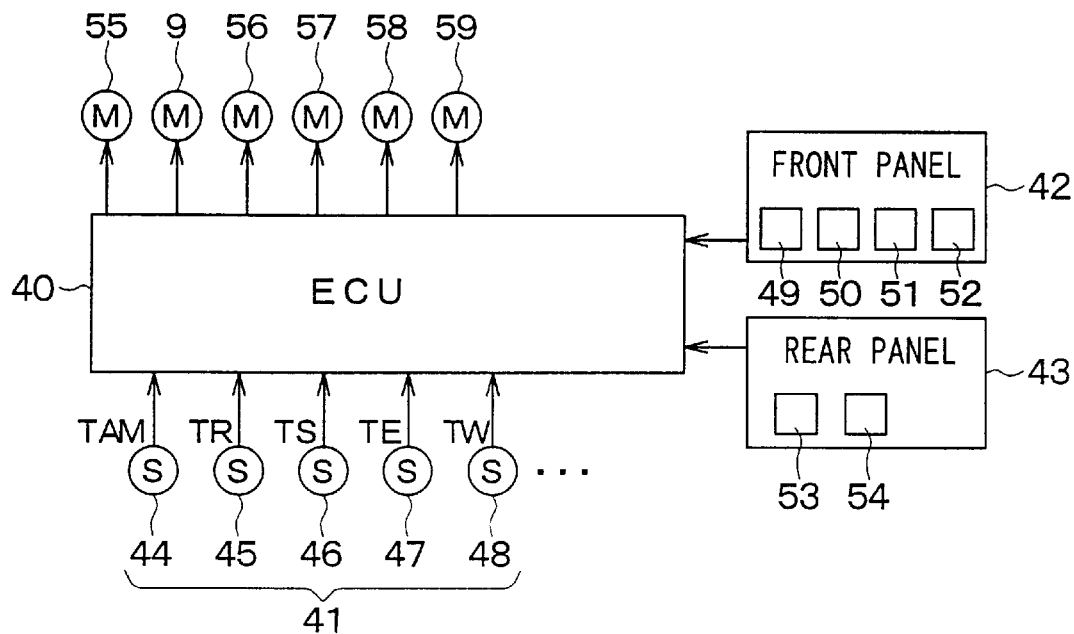
FIG. 3 is a block diagram showing an electronic control system of the vehicle air conditioner according to the first embodiment.

As shown in FIG. 3, each air-conditioning component of the vehicle air conditioner is automatically controlled by an air-conditioning electronic control unit (ECU) 40 according to preset programs. The ECU 40 is constructed by a microcomputer and the like.

The ECU 40 reads sensor signals from a sensor group 41 and operation signals from a front air-conditioning operation panel 42 and from a rear air-conditioning operation panel 43. The front air-conditioning operation panel 42 is disposed on the instrument panel at the front side in the passenger compartment. The rear air-conditioning operation panel 43 is disposed at a rear seat side within the passenger compartment. The sensor group 41 includes an outside air temperature sensor 44, an inside air temperature sensor 45, a solar radiation sensor 46, an evaporator temperature sensor 47, a water temperature sensor 48 and the like. The outside air temperature sensor 44 detects a temperature (outside air temperature) TAM of air outside the passenger compartment, and the inside air temperature sensor 45 detects a temperature (inside air temperature) TR of air inside the passenger compartment. The solar radiation sensor 46 detects an amount (sunlight amount) TS of sunlight radiated into the passenger compartment. The evaporator temperature sensor 47 detects a temperature (post-evaporator air temperature) TE of air blown from the evaporator 12, and the water temperature sensor 48 detects a temperature (water temperature) TW of hot water flowing into the heater core 13. On the front air-conditioning operation panel (front operation panel) 42, a front temperature setting device 49, a front air amount setting device 50, a front air-outlet mode setting device 51, a front air-suction mode setting device 52 and the like are provided. On the rear air-conditioning operation panel (rear operation panel) 43, a rear temperature setting device 53, a rear air-outlet mode setting device 54 and the like are provided.

Driving units for driving various air-conditioning components are controlled by the ECU 40. The driving units include a motor 55 for driving the inside/outside air switching door 5, a motor 9 for driving the blower 6, a motor 56 for driving the front air-mixing door 20, a motor 57 for driving the front doors 26, 31, a motor 58 for driving the rear air-mixing door 21, a motor 59 for driving the rear doors 37, 38.

Next, operations of the vehicle air conditioner according to the first embodiment will be now described. First, the operation of a mechanical mechanism in the ventilation system of the vehicle air conditioner is described.

When a face mode is set at both of the front and rear seat sides, the defroster door 26 closes the defroster opening 25, and fully opens the communication port 28. Further, a front inlet passage 33 of the front foot opening 30 is fully closed by the front foot/face switching door 31. Simultaneously, by the rear doors 37, 38, the rear face opening 35 is fully opened and the rear foot opening 36 is fully closed.

Figure 2:
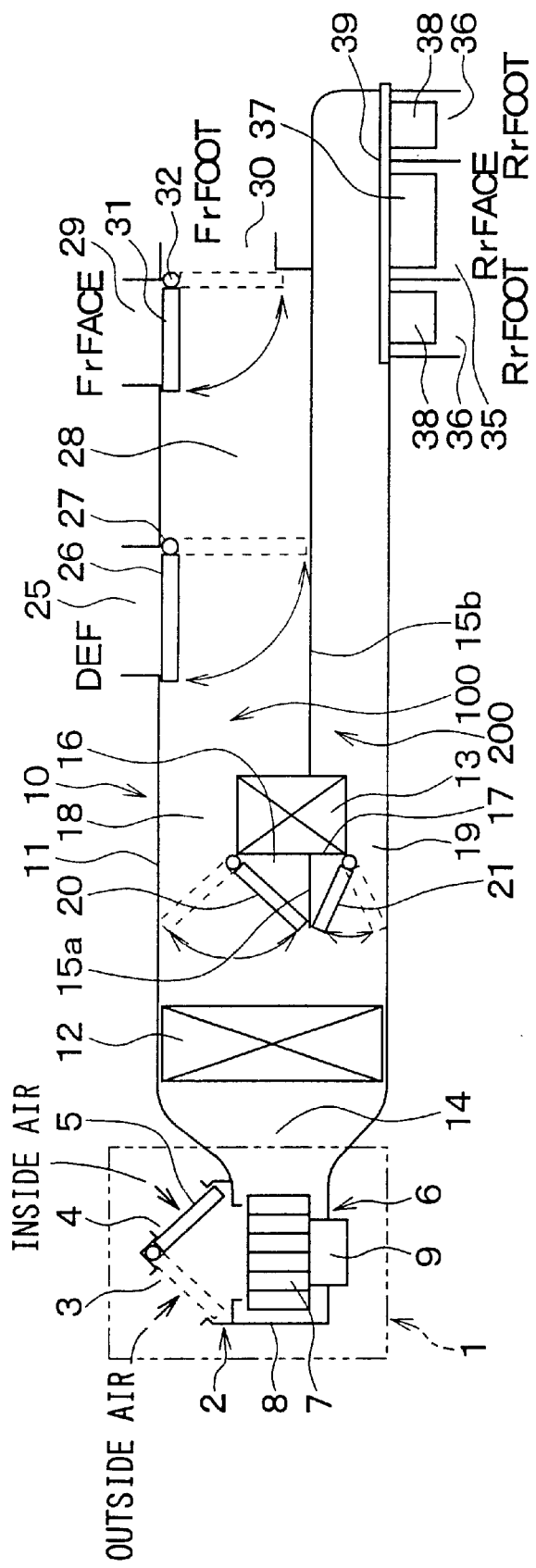
FIG. 2 is a schematic diagram showing a ventilation system of the vehicle air conditioner according to the first embodiment.

In this case, when the front air-mixing door 20 is operated to a position (maximum cooling position) a1 shown in FIG. 1, the front core passage 16 is entirely closed, and the front cool-air bypass passage 18 is entirely opened, so that a maximum cooling state is set. In this state, when the blower 6 and the refrigerant cycle system are operated, air blown by the blower unit 1 flows from the air inlet 14 into the evaporator 12 to be cooled. In the maximum cooling state, cool air from the evaporator 12 passes through the front cool-air bypass passage 18, and flows toward the front face opening 29 through the front air-mixing space 24 and the communication port 28. Thus, cool air is blown toward the upper half body of the passenger on the front seat from the front face air outlet.

When the front air-mixing door 20 is operated to a position between the position a1 and the position a2 shown in FIG. 1, a large amount of the cool air flows through the front cool-air bypass passage 18 in accordance with the open degree position of the front air-mixing door 20. The remainder part of the cool air flows into the front core passage 16 of the heater core 13, and is heated by the heater core 13 to be warm air. The warm air flows upward in the front warm air passage 23. Then, the cool air from the front cool-air bypass passage 18 and the warm air from the front warm air passage 23 are mixed with each other in the front air-mixing space 24, and are adjusted at a predetermined temperature.

When the rear air-mixing door 21 is operated to a position b1 shown in FIG. 1, the rear core passage 17 is entirely closed, and the rear cool-air bypass passage 19 is entirely opened, so that a maximum cooling state is set at the rear seat side. In the maximum cooling state for the rear seat side, the cool air from the evaporator 12 flows through the rear cool-air bypass passage 19, and flows toward the rear face opening 35 through the rear air-mixing space 34. Then, the cool air is blown to the upper half body of the passenger on the rear seat from the rear face air outlet. When the rear air-mixing door 21 is operated to a position between the position b1 and a position b2 shown in FIG. 1, the rear core passage 17 of the heater core 13 is opened. Therefore, even on the rear seat side, a ratio between the cool air amount from the rear cool-air bypass passage 19 and the warm air amount from the rear core passage 17 can be adjusted in accordance with the open degree position of the rear air-mixing door 21. Thus, the cool air and the warm air are mixed with each other in the rear air-mixing space 34, and a desired air temperature can be obtained for the rear seat side.

That is, in the first embodiment, the operation position (rotation position) of the front air-mixing door 20 and operation position of the rear air-mixing door 21 can be controlled independently from each other. Therefore, the temperature of air blown from the front face air outlet and the temperature of air blown from the rear face air outlet can be independently controlled.

Similarly, a front bi-level mode where both of the front face opening 29 and the front foot opening 30 are opened, and a rear bi-level mode where both of the rear face opening 35 and the rear foot opening 36 are opened can be set.

Further, a front foot mode, where the front foot opening 30 is fully opened and the front face opening 29 is fully closed, can be set. A rear foot mode, where the rear foot opening 36 is fully opened and the rear face opening 35 is fully closed, can be set. In addition, a defroster mode where the defroster opening 25 is entirely opened and the communication port 28 is entirely closed can be set.

Even in each of the bi-level mode and the foot mode, the operation position (rotation position) of the front air-mixing door 20 and the operation position of the rear air-mixing door 21 can be controlled independently from each other. Therefore, even in this case, the air temperature blown toward the front seat side and the air temperature blown toward the rear seat side can be controlled independently. In the defroster mode, the temperature of air blown from the defroster opening 25 can be controlled by controlling the operation position (rotation position) of the front air-mixing door 20.

Next, the control of the air-blowing amount according to the first embodiment will be now described. When a power switch is turned on, the ECU 40 starts a control program, and performs control operations in accordance with a base flow diagram shown in FIG. 4. At step S1, various timers and control flags are initialized. At step S2, the ECU 40 reads operation signals such as a signal of a front set temperature Tsetf and a signal of a rear set temperature Tsetr from the temperature setting devices 49, 53 on the front and rear operation panels 42, 43. At step S3, the ECU 40 reads sensor signals from the sensors 44–48 for detecting vehicle environmental conditions relative to the air-conditioning state, such as the outside air temperature TAM, the inside air temperature TR, the sunlight amount TS, the evaporator air temperature TE and the water temperature TW.

At step S4, a target temperature (front target temperature) TAOf of air blown to the front seat side in the passenger compartment is calculated based on the following formula (1). The front target temperature TAOf is required for maintaining the temperature of the front seat side at the front set temperature Tsetf, irrespective of the change of the vehicle environmental condition (air-conditioning thermal load condition).

$$TAOf = Kset \times Tsetf - Kr \times TR - Kam \times TAM - Ks \times TS + C \tag{1}$$

wherein, each of Kset, Kr, Kam, Ks indicates a control gain, and C indicates a correction constant. A rear target temperature TAOr for the rear seat side is also independently calculated similarly to the calculation of the front target temperature TAOf. Therefore, a detail explanation for the rear target temperature TAOr is omitted.

At step S5, a target open degree (front target open degree) SWf of the front air-mixing door 20 is calculated based on the following formula (2).

$$SWf = [(TAOf - TE)/(TW - TE)] \times 100 (\%) \tag{2}$$

A target open degree SWr of the rear air-mixing door 21 is calculated similarly to the calculation of the above formula (2).

At step S6, an air suction mode is determined. That is, at step S6, it is determined whether or not an inside air circulation mode or an outside air introduction mode is set based on the front target temperature TAOf. In the inside air circulation mode, an inside air introduction port 4 is entirely opened and an outside air introduction port 3 is entirely closed by the inside/outside air switching door 5, so that only the inside air is introduced from the inside air introduction port 4. In the outside air introduction mode, the outside air introduction port 3 is entirely opened and the inside air introduction port 4 is entirely closed by the inside/outside air switching door 5, so that only the outside air is introduced from the outside air introduction port 3. Specifically, the inside air circulation mode is selected in a target temperature area (most cooling area) where the front target temperature TAOf is equal to or lower than a predetermined temperature. Further, the outside air introduction mode is selected in a target temperature area (most heating area) where the front target temperature TAOf is higher than the predetermined temperature. An inside/outside air introduction mode, where both the inside air and the outside air are introduced at the same time, may be set between the inside air circulation mode and the outside air introduction mode.

At step S7, it is determined whether or not a compressor (not shown) of the refrigerant cycle system including the evaporator 12 is driven or stopped. Specifically, when the evaporator air temperature TE is higher than a target evaporator air temperature TEO, a solenoid clutch of the compressor is energized, and the compressor is driven. When the evaporator air temperature TE is lower than the target evaporator air temperature TEO, the solenoid clutch of the compressor is deenergized, and the compressor is stopped. Thus, the evaporator air temperature TE is maintained at the target evaporator air temperature TEO, by using the ON-OFF operation control of the solenoid clutch of the compressor.

Figure 5:
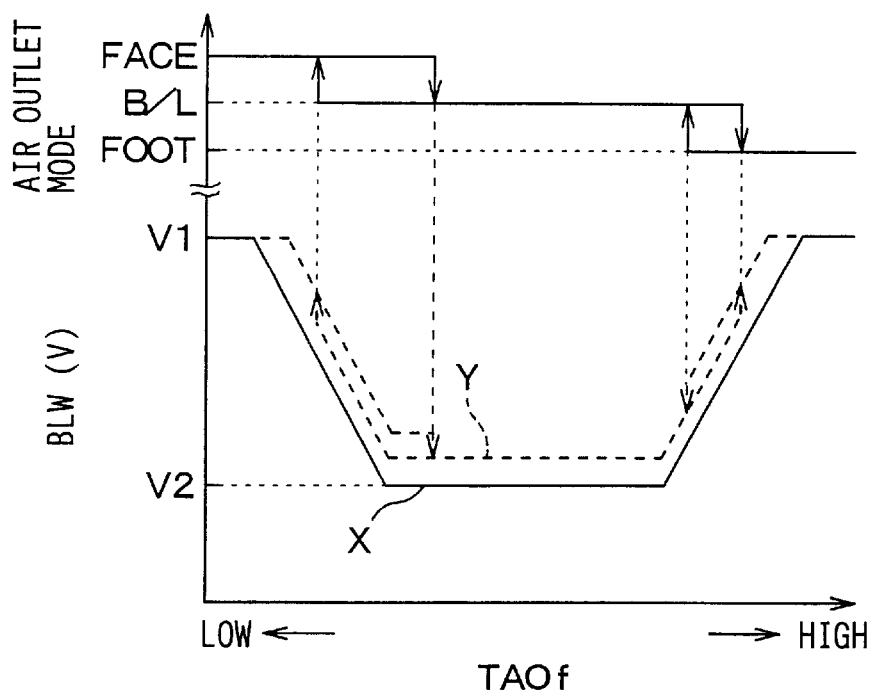
FIG. 5 is a characteristic view for correcting an air-blowing amount according to the first embodiment.
Figure 4:
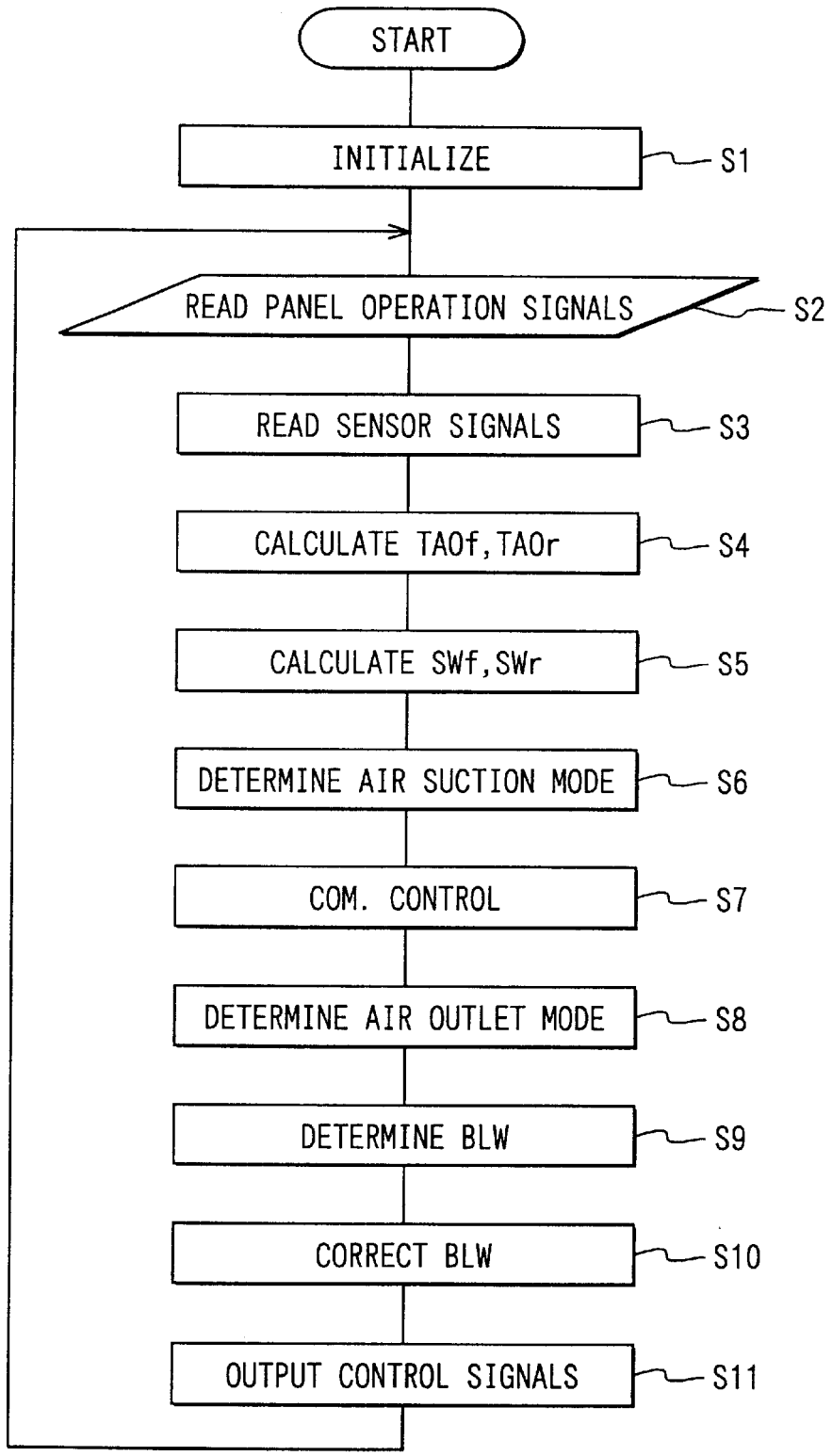
FIG. 4 is a flow diagram showing a basic control of the vehicle air conditioner according to the first embodiment.

At step S8, an air outlet mode, for blowing air into the passenger compartment, is determined. As shown in FIG. 5, as the front target temperature TAOf increases from a low temperature side to a high temperature side, a front air outlet mode for the front seat side is automatically switched from a face (FACE) mode to a foot (FOOT) mode through a bi-level (B/L).

At the rear seat side, a rear air outlet mode can be set similarly to the determination of the front air outlet. That is, as the rear target temperature TAOr increases from a low temperature side to a high temperature side, the rear air outlet mode is automatically switched from a face (FACE) mode to a foot (FOOT) mode through a bi-level (B/L). Both of the front air outlet mode and the rear air outlet mode can be freely set by manually operation of the mode setting devices 51, 54 on the operation panels 42, 43 irrespective of the target temperatures TAOf, TAOr, respectively. A defroster mode can be manually set by the front air-outlet mode setting device 51, and a rear air shutting state can be manually set by the rear air-outlet mode setting device 54. In the rear air shutting state, air is not blown to the rear seat of the passenger compartment.

At step S9, a blower voltage BLW applied to the blower motor 9 is determined based on the front target temperature TAOf as indicated by solid lines X shown in FIG. 5. Since a rotation speed (air-blowing amount) of the blower 6 is proportional to the blower voltage BLW, the air-blowing amount of the blower 6 is determined based on the front target temperature TAOf.

In FIG. 5, the solid line X indicates the blower voltage BLW in the rear air-shutting state. That is, in the rear air-shutting state, air is not blown toward the rear seat. In this rear air-shutting state, the blower voltage BLW becomes the highest voltage V1 in a low temperature area of the front target temperature TAOf (i.e., in a low temperature area where the FACE mode is selected) and in a high temperature area of the front target temperature TAOf (i.e., in a high temperature area where the FOOT mode is selected). Further, the blower voltage BLW becomes the lowest voltage V2 in an intermediate temperature area of the front target temperature TAOf (i.e., in an intermediate temperature area where the B/L mode is selected). The blower voltage BLW is gradually changed between the highest voltage V1 and the lowest voltage V2, so that the air-blowing amount of the blower 6 can be continuously changed from the maximum air-blowing amount due to the highest voltage V1 to the minimum air-blowing amount due to the lowest voltage V2.

Next, at step S10, the bower voltage BLW is corrected in a rear air-blowing state where air is blown toward the rear seat. This correction process is specifically indicated by the flow diagram shown in FIG. 6. At step S101, it is determined whether or not the air outlet mode (i.e., front air outlet mode) for the front seat side is automatically set. When it is determined that the front air outlet mode is automatically set at step S101, the front air outlet mode is automatically set based on the front target temperature TAOf as shown in FIG. 5. In this case, the determination of step S101 is YES, and the control program proceeds to step S102.

At step S102, it is determined whether or not the rear opening 35, 36 is opened from a closing state. That is, it is determined whether or not the rear opening 35, 36 is changed from a closing state to an opening state. Here, both of the rear openings 35, 36 are closed in the closing state, and at least one of the rear openings 35, 36 is opened in the opening state.

Immediately after the closing state of the rear openings 35, 36 is changed to the opening state, the determination of step S102 is YES, and the control program proceeds to step S103. At step S103, it is determined whether or not the front air outlet mode is the front FACE mode. When the front air outlet mode is the front FACE mode, the control program proceeds to step S104. At step S104, the blower voltage BLW is corrected by a predetermined voltage. For example, at step S104, a voltage of +2 V is added to the blower voltage BLW. In the first embodiment, when the voltage of +2 V is added to the blower voltage BLW, the rotation speed of the blower motor 9 is increased by 400 rpm, and the air-blowing amount of the blower 6 is increased by 80 m$^3$/h.

When the determination of step S103 is NO, it is determined whether or not the front air outlet mode is the foot mode. When the front air outlet mode is the foot mode, the control program proceeds to step S104, and the voltage of +2 V is added to the blower voltage BLW at step S104.

When the front air outlet mode is the bi-level mode, the determination of step S105 is NO, and the control program proceeds to step S106. At step S106, the blower voltage BLW is increased by a predetermined voltage that is smaller than that at step S104. For example, at step S106, a voltage of +1 V is added to the blower voltage BLW. When the voltage of +1 V is added to the blower voltage BLW, the rotation speed of the blower motor 9 is increased by 200 rpm, and the air-blowing amount of the blower 6 is increased by 30 m$^3$/h.

When it is not in a state immediately after the rear opening 35, 36 is changed from the closing state to the opening state, the determination at step 102 is always NO. In this case, at step S107, it is determined whether the rear opening 35, 36 is changed from the opening state to the closing state. When it is in a state not immediately after the opening state of the openings 35, 36 is changed to the closing state, the determination at step S107 is always NO, and the correction for the blower voltage BLW is not performed.

When the correction of the blower voltage BLW is already performed at steps S104, S106, the corrected state is maintained. Alternatively, when the correction of the blower voltage BLW is not performed, the blower voltage BLW, determined based on the front target temperature TAOf at the step S9 as indicated by the solid lines X in FIG. 5, is maintained.

When the state, immediately after the opening state of the rear opening 35, 36 is changed to the closing state, is determined at step S107, the correction operation of the blower voltage BLW is released, so that the blower voltage BLW is returned to the blower voltage BLW determined based on the front target temperature TAOf at the step S9. When the front air outlet mode is manually set by the front air-outlet mode setting device 51, the determination of step S101 is NO, and the control program proceeds to step S108. At step S108, the correction operation of the blower voltage BLW is released, and the blower voltage BLW is returned to the blower voltage determined based on the front target temperature TAOf. At step S11 shown in FIG. 4, the control signals determined at steps S5–S10 are outputted to the blower motor 9 and the actuators 55–59, respectively, so that each of air-conditioning components is controlled.

In the first embodiment, the chain lines Y shown in FIG. 5 indicate the blower voltage BLW corrected in accordance with the air-blowing operation toward the rear seat. The increased correction voltage is +2 V in the front face mode and the front foot mode, and is +1 V in the front bi-level mode. That is, the increased correction voltage is made larger in the front face mode and the front foot mode than that in the front bi-level mode. Thus, the following effects can be obtained. That is, the low temperature area of the front target temperature TAOf, where the front face mode is automatically set, is a transient time immediately after a start of a cooling operation. Therefore, in this case, a large cooling capacity is required, and the air-blowing amount is made larger. The high temperature area of the front target temperature TAOf, where the front foot mode is automatically set, is a transient time immediately after a start of a heating operation. Therefore, in this case, a large heating capacity is required, and the air-blowing amount is made larger.

If the air-blowing amount for the front seat side is reduced due to the air blown to the rear seat side in the front face mode or in the front foot mode, an amenity is largely reduced in the passenger compartment at the front seat side. Accordingly, in the first embodiment, when air is blown to the rear seat side in the front face mode or in the front foot mode, the increased correction value of the blower voltage BLW is set at a large voltage such as +2 V, and the increased air amount of the blower 6 is made larger. Thus, the air-blowing amount toward the front seat side is restricted from being reduced, thereby improving the amenity in the passenger compartment at the front seat side.

On the other hand, the bi-level mode is automatically set in the intermediate temperature area of the front target temperature TAOf as shown in FIG. 5. The intermediate area is calculated in a stationary state where a long time passes after starting an air-conditioning operation and air-conditioning load becomes smaller. In the bi-level mode, because a necessary air-conditioning capacity becomes smaller, the air-blowing amount can be set smaller. Accordingly, in the intermediate temperature area, that is, in the bi-level mode, even when the increased correction value is set at a small voltage such as +1 V, the air-blowing amount for the front seat side can be restricted from being reduced, thereby improving the amenity in the passenger compartment at the front seat side.

Figure 6:
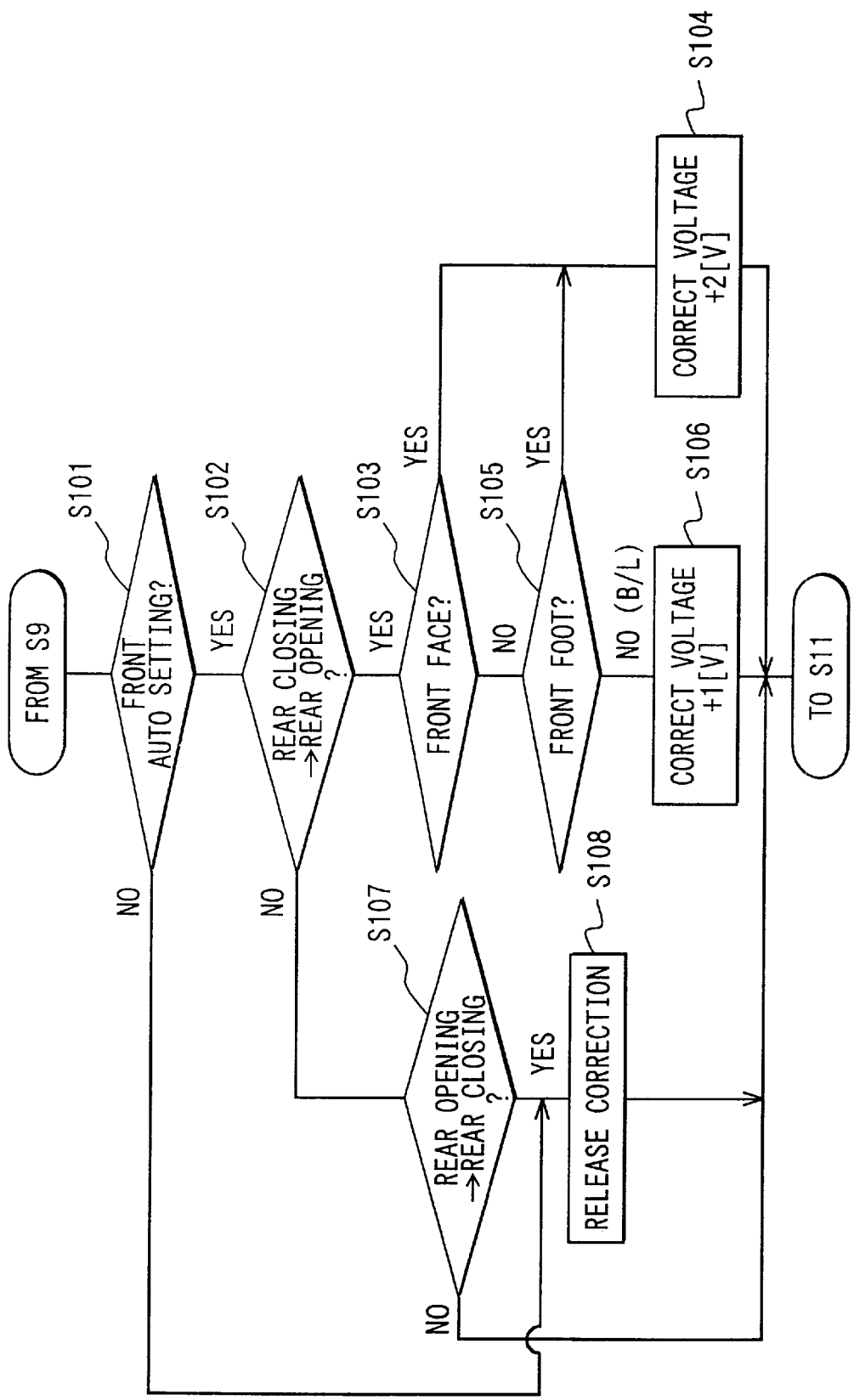
FIG. 6 is a flow diagram for performing a correction of the air-blowing amount according to the first embodiment.

When the front air outlet mode is manually set, the control program proceeds from step S101 directly to step S108 in FIG. 6, and the correction operation of the blower voltage BLW is released at step S108. That is, when the front air outlet mode is manually set, the front air outlet mode is selected by the passenger irrespective of the blower voltage BLW determined based on the front target temperature TAOf. Accordingly, in the first embodiment, when the front air outlet mode is manually set, the correction operation of the blower voltage BLW is released.

A second preferred embodiment of the present invention will be now described with reference to FIG. 7. In the second embodiment, the correction voltage of the blower voltage BLW is changed according to an open degree of the front air-mixing door 20.

Figure 7:
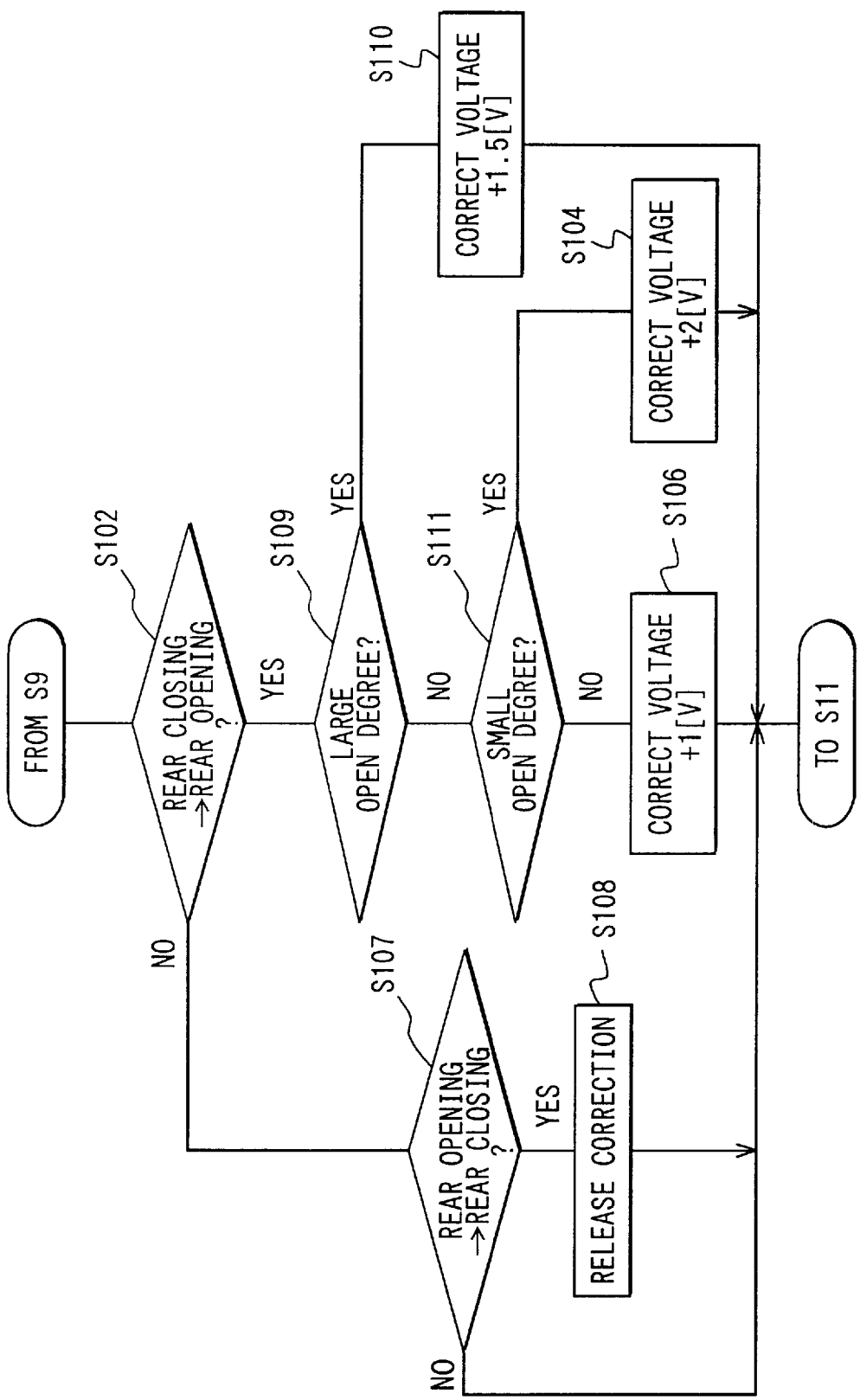
FIG. 7 is a flow diagram for performing a correction of the air-blowing amount according to a second preferred embodiment of the present invention.

The correction control (step S10) according to the second embodiment is specifically indicated by the flow diagram shown in FIG. 7. In FIG. 7, steps similar to those shown in FIG. 6 are indicated by the same reference numbers, and the explanation of thereof is omitted. At step S102 in FIG. 7, when the state, immediately after the closing state of the rear openings 35, 36 is changed to the opening state of the rear openings 35, 36, is determined, the control program proceeds to step S109. At step S109, it is determined whether or not an operation position of the front air-mixing door 20 is in a large open degree area (i.e., high temperature area at a maximum heating side). For example, when the operation position of the front air-mixing door 20 is at a maximum cooling position a1 indicated by the solid line in FIG. 1, the open degree of the front air-mixing door 20 is defined as 0%. When the operation position of the front air-mixing door 20 is at a maximum heating position a2 indicated by chain lines in FIG. 1, the open degree of the front air-mixing door 20 is defined as 100%. In the second embodiment, the large open degree area is defined in a predetermined area at the side of the open degree of 100%, for example, in an area between an open degree of 60% or 70% and the open degree of 100%.

The determination at step S109 can be performed using the front target open degree SWf of the front air-mixing door 20. When the front target open degree SWf is in the large open degree area, the determination at step S109 is YES, and the blower voltage BLW is corrected to be increased by +1.5 V at step S110.

When the determination of step S109 is NO, the control program proceeds to step S111, and it is determined whether or not the operation position of the front air-mixing door 20 is in a small open degree area at the maximum cooling side. The small open degree area is a predetermined area at the side of the maximum cooling position a1 (open degree of 0%) indicated by the solid line in FIG. 1, for example, in an area between the open degree of 0% and an open degree of 30% or 40%. When the front target open degree SWf is in the small open degree area, the determination at step S111 is YES, and the blower voltage BLW is corrected to be increased by +2 V at step S104.

When the determination at step S111 is NO, that is, when the operation position of the front air-mixing door 20 is in an intermediate open area between the small opening degree area and the large opening degree area, the control program proceeds to step S106. At step S106, the blower voltage BLW is corrected to be increased by +1 V.

That is, in the second embodiment, when the rear openings 35, 36 are opened and the air-blowing operation to the rear seat side is performed, the correction for increasing the air-blowing amount is performed.

Specifically, when the operation position of the front air-mixing door 20 is in the small open degree area at the maximum cooling side, the blower voltage BLW is corrected to be increased by a large voltage of +2 V. When the operation position of the front air-mixing door 20 is in the large open degree at the maximum heating side, the blower voltage BLW is corrected to be increased by a middle voltage of +1.5 V. In addition, when the operation position of the front air-mixing door 20 is in the intermediate open area, the blower voltage BLW is corrected to be increased by a small voltage of +1 V.

When the operation position of the front air-mixing door 20 is in the small open degree area at the maximum cooling side, the front face mode is automatically set in accordance with the front target temperature TAOf shown in FIG. 5. In the front face mode, since cool air is blown to the upper half body of the passenger on the front seat, the change of the air-blowing amount is most readily sensed by the passenger in the front face mode, among the front FACE, B/L and FOOT modes. Accordingly, in the small open degree area, the blower voltage BLW is corrected to be increased by the large voltage (e.g., +2 V). Thus, in the front face mode, it can restrict the cool-air blowing amount from being reduced due to the air-blowing operation to the rear seat side, and the amenity in the passenger compartment can be improved.

When the operation position of the front air-mixing door 20 is in the large open degree area at the maximum heating side, the front foot mode is set according to the characteristics graph shown in FIG. 5, based on the front target temperature TAOf. Since the warm air is blown to the foot area of the passenger in the front foot mode, the change of the air-blowing amount is hardly sensed in the front foot mode, among the face mode, the bi-level mode and the foot mode. However, in the front foot mode, the air-blowing amount is made larger to ensure the heating performance in a large thermal-load condition. Accordingly, in the large open degree area, the blower voltage BLW is corrected to be increased by the intermediate voltage (e.g., +1.5 V), and the air amount can be set to a necessary amount for obtaining the heating performance. Thus, in the front foot mode, it can restrict the warm-air blowing amount from being reduced even when air is blown to the rear seat side, and it can restrict the amenity in the passenger compartment from being reduced.

When the operation position of the front air-mixing door 20 is in the intermediate open degree area, the front bi-level mode is set according to the characteristic view shown in FIG. 5 based on the front target air temperature TAOf. Since the air-blowing amount is made smaller in the front bi-level mode, it can restrict the amenity in the passenger compartment from being reduced even when the blower voltage BLW is corrected to be increased by the small voltage (e.g., +1 V) when air is blown toward the rear seat side.

A third preferred embodiment of the present invention will be now described with reference to FIG. 8. In the third embodiment, the correction voltage of the blower voltage BLW is changed according to the blower voltage BLW before the correction. As indicated by the solid line X in FIG. 5, the blower voltage BLW before the correction is determined by the front target temperature TAOf.

Figure 8:
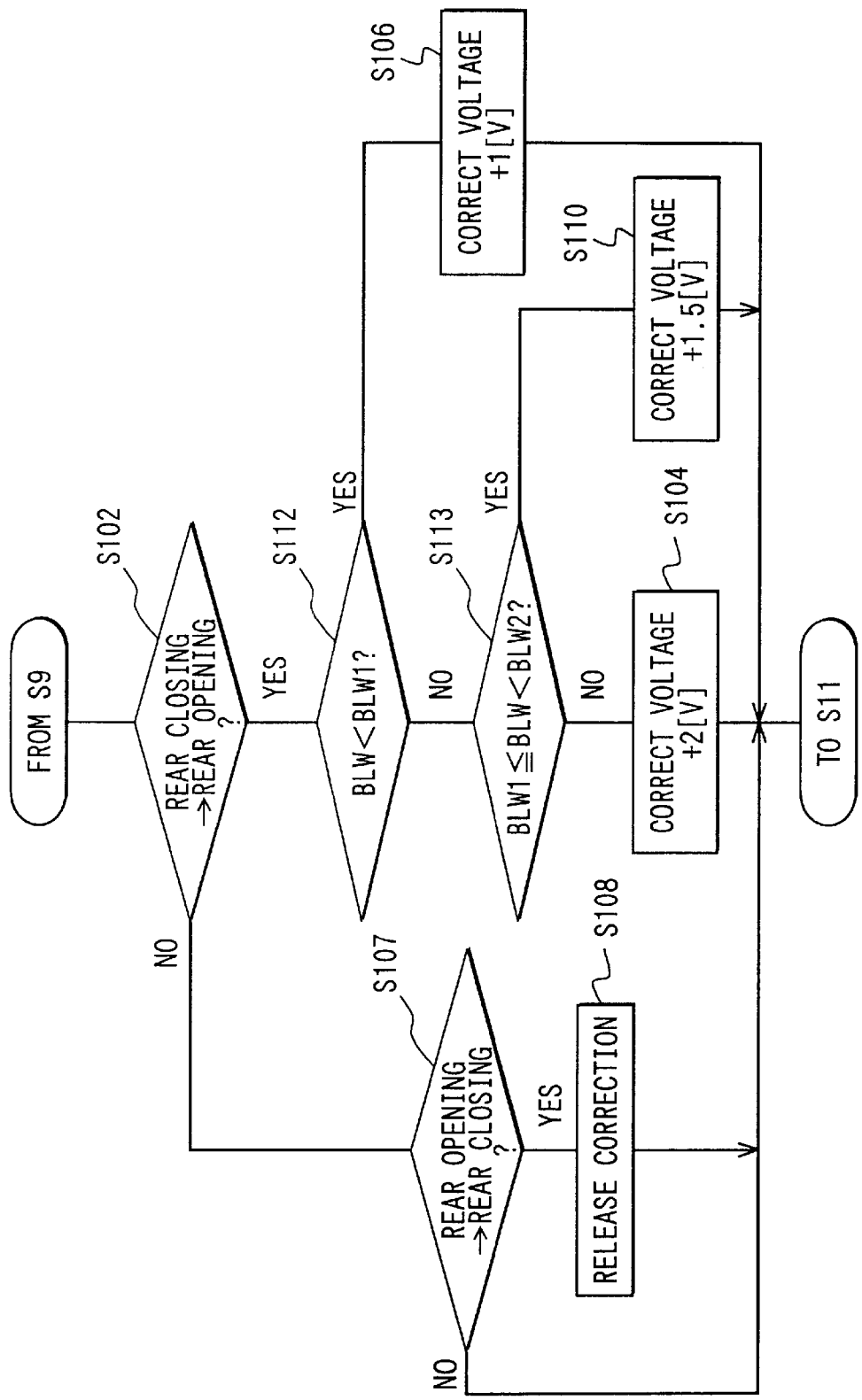
FIG. 8 is a flow diagram for performing a correction of the air-blowing amount according to a third preferred embodiment of the present invention.

A blower correction control according to the third embodiment is described in detail in accordance with the flow diagram shown in FIG. 8. At step S102 in FIG. 7, when the state, immediately after the closing state of the rear openings 35, 36 is changed to the opening state of the rear openings 35, 36, is determined, the control program proceeds to step S112. At step S112, it is determined whether or not the blower voltage BLW before the correction is smaller than a first predetermined voltage BLW1 (e.g., 5 V). In FIG. 5, for example, a minimum voltage V2 of the blower voltage BLW is 4 V, and a maximum voltage V1 of the blower voltage BLW is the same level as a charged voltage of a vehicle battery (e.g., 12 V). Therefore, the first predetermined voltage BLW1 is set to be slightly larger than the minimum voltage V2.

When the determination of step S112 is YES, the control program proceeds to step S106, and the blower voltage BLW is corrected to be increased by the small voltage of +1 V. When the blower voltage BLW before the correction is equal to or larger than the first predetermined voltage BLW1, it is determined whether or not the blower voltage BLW is equal to or larger than the first predetermined voltage BLW1 and is smaller than a second predetermined voltage BLW2 (e.g., 8V). When the determination of step S113 is YES, the control program proceeds to step S110, and the blower voltage BLW is corrected to be increased by an intermediate voltage of +1.5 V. When the determination of step S113 is NO, that is, when the blower voltage BLW >BLW2 (e.g., 8V), the control program proceeds to step S104, and the blower voltage BLW is corrected to be increased by the large voltage of +2 V.

That is, in the third embodiment, the increased correction voltage of the blower voltage BLW is switched among large, intermediate and small voltages, in accordance with the large, intermediate and small voltages of the blower voltage BLW before the correction, respectively. As shown in FIG. 5, the blower voltage BLW is changed in accordance with the front target temperature TAOf. Therefore, in the third embodiment, the amenity in the passenger compartment can be improved even when air is blown toward the rear seat.

A fourth preferred embodiment of the present invention will be now described with reference to FIG. 9. In the above-described first embodiment, when the front air outlet mode is manually set, the correction operation of the blower voltage BLV is released. However, in the fourth embodiment, when the front air outlet mode is manually set, the blower voltage BLW is corrected to be increased when air is blown toward the rear seat.

Figure 9:
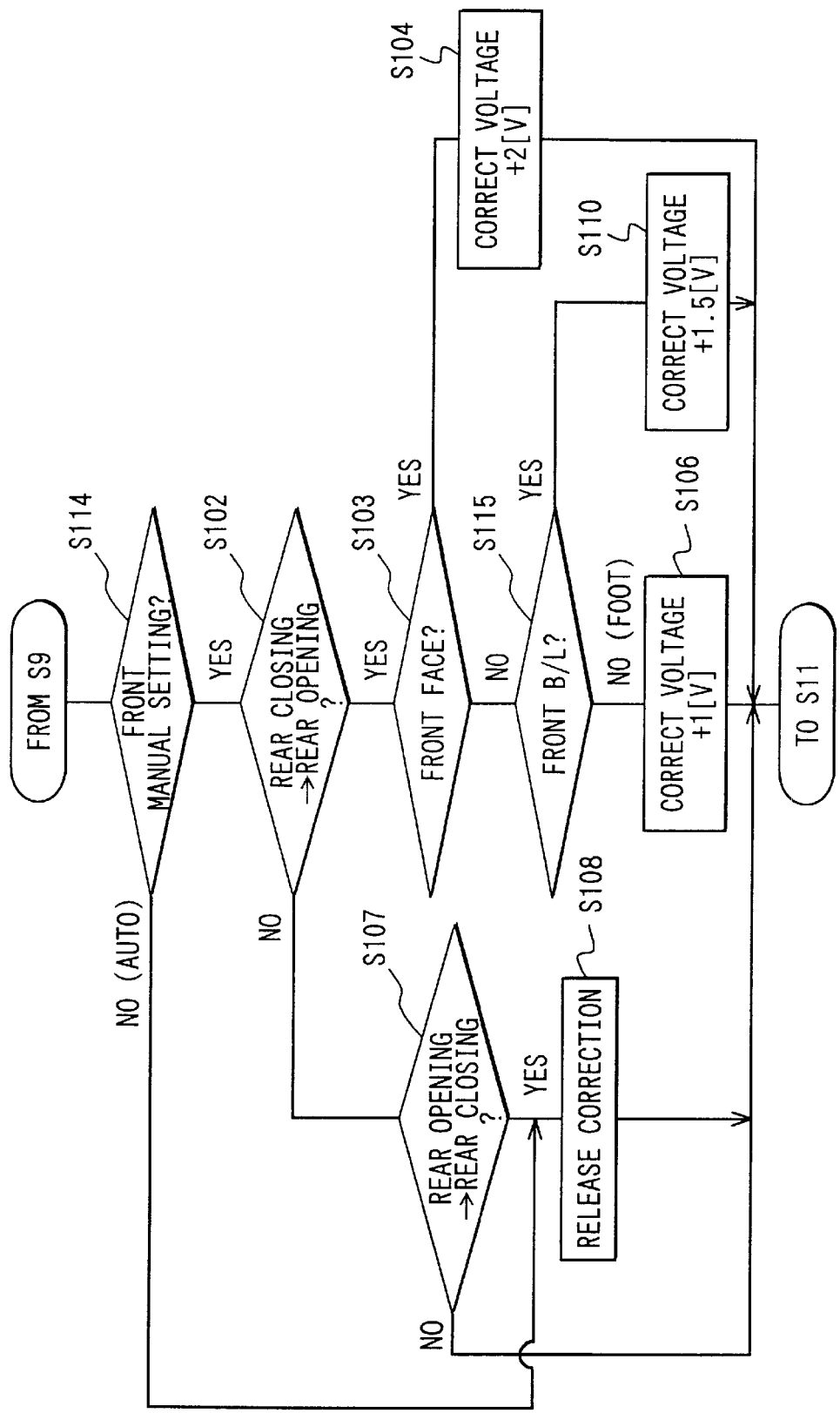
FIG. 9 is a flow diagram for performing a correction of the air-blowing amount according to a fourth preferred embodiment of the present invention.

A correction control of the blower voltage according to the fourth embodiment is described based on the flow diagram shown in FIG. 9. At step S114, it is determined whether the front air outlet mode is manually set by the air-outlet mode setting device 51. When it is determined that the front air outlet mode is manually set (manual setting) at step S114, it is determined whether or not it is in a state immediately after the closing state of the rear openings 35, 36 is changed to the opening state of the rear openings 35, 36. When it is in the state immediately after opening the rear openings 35, 36 from the closing state, the control program proceeds to step S103, and it is determined whether the front air outlet mode is the front face mode at step S103. When the front face mode is determined at step S103, the blower voltage BLW is corrected to be increased by the large voltage of +2 V.

When the front face mode is not determined at step S103, it is determined whether the front air outlet mode is the bi-level mode at step S115. When the front bi-level mode is determined at step S115, the blower voltage is corrected to be increased by an intermediate voltage of +1.5 V. When the determination of step S115 is NO, that is, when the front air outlet mode is the front foot mode, the blower voltage BLW is corrected to be increased by the small voltage of +1 V.

The changes of the air-blowing amount and the air-blowing temperature are readily sensed by the upper half body (face portion) of the passenger. Therefore, while the air outlet mode is changed from the front foot mode to the front face mode through the bi-level mode, the thermal sensitivity of the passenger due to the change of the air-blowing amount becomes higher. Accordingly, in the fourth embodiment, when the rear openings 35, 36 is changed from closing state to the opening state when the front air outlet mode is manually set, the blower voltage BLW is corrected at steps S104, S106, S110 in FIG. 9. Specifically, the blower voltage BLW is corrected to be increased by the large voltage (e.g., +2 V) in the manually-set front face mode at step S104, the blower voltage BLW is corrected to be increased by the intermediate voltage (e.g., +1.5 V) in the manually-set front bi-level mode at step S110, and the blower voltage BLW is corrected to be increased by the small voltage (e.g., +1 V) in the manually-set front foot mode. Accordingly, the correction of the air-blowing amount can be suitably performed according to the change of the manually-set air outlet mode, and the air amount suitable for the thermal feeling of the passenger can be obtained.

Although the present invention has been fully described in connection with the preferred embodiments thereof with reference to the accompanying drawings, it is to be noted that various changes and modifications will become apparent to those skilled in the art.

In the fourth embodiment, when the front air outlet mode is automatically set, the correction of the air blowing amount is released. However, when the front air outlet mode is automatically set, the control of the first embodiment in FIG. 6 can be performed. That is, the correction control of the blower voltage BLW in the automatically-set air outlet mode described in the first embodiment can be combined with the correction control of the blower voltage BLW in the manually-set air outlet mode described in the fourth embodiment.

In the above-described first embodiment of the present invention, when the front foot mode is automatically selected, the increased correction voltage is set larger than that in the front bi-level mode. However, when the front foot mode is automatically selected, the increased correction voltage can be set smaller than that in the front bi-level mode while air is blown toward the rear seat in the passenger compartment.

Such changes and modifications are to be understood as being within the scope of the present invention as defined by the appended claims.

What is claimed is:

1. An air conditioner for a vehicle having a passenger compartment, comprising:
    an air-conditioning case for defining a front air passage through which air flows at least toward an upper side of a front seat in the passenger compartment, and a rear air passage through which air flows toward a rear seat in the passenger compartment;
    a blower for blowing air into the passenger compartment through the front air passage and the rear air passage;
    an air-amount adjustment unit which adjusts an amount of air blown at least toward the upper side of the front seat in the passenger compartment;
    an opening/closing unit for opening and closing the rear air passage;
    air-amount determination means for determining an air-blowing amount of the blower;
    air-amount correction means for increasing the air-blowing amount determined by the air-amount determination means when the rear air passage is opened by the opening/closing unit; and
    target temperature calculation means for calculating a target temperature of air blown toward the front seat in the passenger compartment, wherein:
        the air-amount correction means sets an increase amount of the air-blowing amount to be larger when an amount of air blown to the upper side of the front seat is larger than a predetermined amount, than that when the amount of air blown to the upper side of the front seat is smaller than the predetermined amount;
        at a downstream end side of the front air passage, the air conditioning case has a face opening from which air is blown to the upper side of the front seat, and a foot opening from which air is blown to a lower side of the front seat;
        the air-amount adjustment unit is a mode door for opening and closing the face opening and the foot opening;
        in a face mode where air is blown from the face opening opened by the mode door, the amount of air blown toward the upper side of the front seat is larger than the predetermined amount;
        in a bi-level mode where air is blown from both of the face opening and the foot opening opened by the mode door, the amount of air blown toward the front seat is smaller than the predetermined amount;
        the face mode is set when the target temperature is lower than a first predetermined temperature;
        a foot mode, where air is blown from the foot opening opened by the mode door, is set when the target temperature is higher than a second predetermined temperature higher than the first predetermined temperature; and
        the bi-level mode is set when the target temperature is in an area between the first predetermined temperature and the second predetermined temperature.

2. The air conditioner according to claim 1, wherein: in the bi-level mode, the increase amount of the air-blowing amount is set larger than that in the foot mode.

3. The air conditioner according to claim 1, wherein:
    when the air-blowing amount determined by the air-amount determining means is larger than a set amount, the air-amount correction means increases the air-blowing amount by an increase amount that is larger than that when the air-blowing amount determined by the air-amount determining means is smaller than the set amount.

4. An air conditioner for a vehicle having a passenger compartment, comprising:

an air-conditioning case for defining a front air passage through which air flows at least toward an upper side of a front seat in the passenger compartment, and a rear air passage through which air flows toward a rear seat in the passenger compartment;

a blower for blowing air into the passenger compartment through the front air passage and the rear air passage;

an air-amount adjustment unit which adjusts an amount of air blown at least toward the upper side of the front seat in the passenger compartment;

an opening/closing unit for opening and closing the rear air passage;

air-amount determination means for determining an air-blowing amount of the blower; and air-amount correction means for increasing the air-blowing amount determined by the air-amount determination means when the rear air passage is opened by the opening/closing unit, wherein the air-amount correction means sets an increase amount of the air-blowing amount to be larger when an amount of air blown to the upper side of the front seat is larger than a predetermined amount, than that when the amount of air blown to the upper side of the front seat is smaller than the predetermined amount;

when the air-blowing amount determined by the air-amount determining means is smaller than a first set value, the air-amount correction means increases the air-blowing amount by an increase amount that is smaller than a first amount;

when the air-blowing amount determined by the air-amount determining means is larger than a second set value larger than the first set value, the air-amount correction means increases the air-blowing amount by an increase amount that is larger than a second amount larger than the first amount; and when the air-blowing amount determined by the air-amount determining means is between the first set value and the second set value, the air-amount correction means increases the air-blowing amount by an increase amount between the first amount and the second amount.

5. An air conditioner for a vehicle having a passenger compartment, comprising:

an air-conditioning case for defining a front air passage through which air flows at least toward an upper side of a front seat in the passenger compartment, and a rear air passage through which air flows toward a rear seat in the passenger compartment;

a blower for blowing air into the passenger compartment through the front air passage and the rear air passage;

an air-amount adjustment unit which adjusts an amount of air blown at least toward the upper side of the front seat in the passenger compartment;

an opening/closing unit for opening and closing the rear air passage;

air-amount determination means for determining an air-blowing amount of the blower; and air-amount correction means for increasing the air-blowing amount determined by the air-amount determination means when the rear air passage is opened by the opening/closing unit, wherein the air-amount correction means sets an increase amount of the air-blowing amount to be larger when an amount of air blown to the upper side of the front seat is larger than a predetermined amount, than that when the amount of air blown to the upper side of the front seat is smaller than the predetermined amount;

at a downstream end side of the front air passage, the air conditioning case has a face opening from which air is blown to the upper side of the front seat, and a foot opening from which air is blown to a lower side of the front seat;

the air-amount adjustment unit is a mode door for opening and closing the face opening and the foot opening, the air conditioner further comprising:

mode determination means for manually setting an air outlet mode by a passenger in the passenger compartment, among a face mode where air is blown from the face opening, a bi-level mode where air is blown from the face opening and the foot opening, and a foot mode where air is blown from the foot opening, wherein, the air-amount correction means sets the increase amount of the air-blowing amount at a small value in the foot mode, sets the increase amount of the air-blowing amount at a middle value larger than the small value in the bi-level mode, and sets the increase amount of the air-blowing amount at a large value larger than the middle value in the face mode.

6. An air conditioner for a vehicle having a passenger compartment, comprising:

an air-conditioning case for defining a front air passage through which air flows at least toward an upper side of a front seat in the passenger compartment, and a rear air passage through which air flows toward a rear seat in the passenger compartment;

a blower for blowing air into the passenger compartment through the front air passage and the rear air passage;

an air-amount adjustment unit which adjusts an amount of air blown at least toward the upper side of the front seat in the passenger compartment;

an opening/closing unit for opening and closing the rear air passage;

air-amount determination means for determining an air-blowing amount of the blower; and air-amount correction means for increasing the air-blowing amount determined by the air-amount determination means when the rear air passage is opened by the opening/closing unit, a heating heat exchanger for heating air flowing in the front air passage and the rear air passage;

an air mixing door for adjusting a ratio between an air amount passing through the heating heat exchanger and an air amount bypassing the heating heat exchanger; and door open-degree determination means for increasing an open degree of the air mixing door as the target temperature increases, wherein the air-amount correction means sets an increase amount of the air-blowing amount to be larger when an amount of air blown to the upper side of the front seat is larger than a predetermined amount, than that when the amount of air blown to the upper side of the front seat is smaller than the predetermined amount;

the air-amount correction means increases the increase amount of the air-blowing amount, determined by the air-amount determination means, larger in a small open-degree area and a large open-degree area of the air mixing door, than that in a middle open-degree area between the small open-degree area and the large open-degree area.

7. The vehicle air conditioner according to claim 6, wherein the air-amount correction means increases the increase amount of the air-blowing amount determined by the air-amount determination means, larger in the small open-degree area of the air mixing door, than that in the large open-degree area thereof.

8. An air conditioner for a vehicle having a passenger compartment, comprising:
   an air-conditioning case for defining a front air passage through which air flows toward an upper side of a front seat in the passenger compartment, and a rear air passage through which air flows toward a rear seat in the passenger compartment, the air conditioning case having a face opening through which air is blown toward an upper side of the front seat in the passenger compartment and a foot opening through which air is blown toward a lower side of the front seat in the passenger compartment at a downstream side of the front air passage;
   a blower for blowing air into the passenger compartment through the front air passage and the rear air passage;
   a mode door for opening and closing the face opening and the foot opening to set a face mode where air is blown from the face opening, a bi-level mode where air is blown from both the face opening and the foot opening, and a foot mode where air is blown from the foot opening;
   an opening/closing unit for opening and closing the rear air passage;
   target temperature calculating means for calculating a target temperature of air blown toward the front seat;
   air-amount determination means for determining an air-blowing amount of the blower, the air-amount determining means determines the air-blowing amount to be larger in a low temperature area where the target temperature is lower than a first predetermined temperature or in a high temperature area where the target temperature is higher than a second predetermined temperature higher than the first predetermined temperature, and determines the air-blowing amount to be smaller in a middle temperature area where the target temperature is between the first predetermined temperature and the second predetermined temperature;
   mode determining means for determining an air outlet mode based on the calculated target temperature, the mode determining means determining the face mode in the low temperature area, the bi-level mode in the middle temperature area, and the foot mode in the high temperature area; and
   air-amount correction means for increasing the air-blowing amount determined by the air-amount determination means when the rear air passage is opened by the opening/closing unit,
   wherein the air-amount correction means sets an increase amount of the air-blowing amount to be larger in the face mode and in the foot mode, than that in the bi-level mode.

9. The air conditioner according to claim 8, wherein:
   when the air-blowing amount determined by the air-amount determining means is smaller than a first set value, the air-amount correction means increases the air-blowing amount by an increase amount that is smaller than a first amount;
   when the air-blowing amount determined by the air-amount determining means is larger than a second set value larger than the first set value, the air-amount correction means increases the air-blowing amount by an increase amount that is larger than a second amount larger than the first amount; and
   when the air-blowing amount determined by the air-amount determining means is between the first set value and the second set value, the air-amount correction means increases the air-blowing amount by an increase amount between the first amount and the second amount.

10. The air conditioner according to claim 8, wherein:
    when the air-blowing amount determined by the air-amount determining means is larger than a predetermined amount, the air-amount correction means increases of the air-blowing amount by an increase amount that is larger than that when the air-blowing amount determined by the air-amount determining means is smaller than the predetermined amount.

11. The vehicle air conditioner according to claim 8, further comprising:
    a heating heat exchanger for heating air flowing in the front air passage and the rear air passage;
    an air mixing door for adjusting a ratio between an air amount passing through the heating heat exchanger and an air amount bypassing the heating heat exchanger; and
    door open-degree determination means for increasing an open degree of the air mixing door as the target temperature increases, wherein
       the air-amount correction means increases the increases amount the air-blowing amount, determined by the air-amount determination means, larger in a small open-degree area and a large open-degree area of the air mixing door, than that in a middle open-degree area between the small open-degree area and the large open-degree area.

12. The vehicle air conditioner according to claim 11, wherein the air-amount correction means increases the increase amount of the air-blowing amount determined by the air-amount determination means, larger in the small open-degree area of the air mixing door, than that in the large open-degree area thereof.

13. An air conditioner for a vehicle having a passenger compartment, comprising:
    an air-conditioning case for defining a front air passage through which air flows toward a front seat in the passenger compartment, and a rear air passage through which air flows toward a rear seat in the passenger compartment;
    a blower for blowing air into the passenger compartment through the front air passage and the rear air passage;
    an opening/closing unit for opening and closing the rear air passage;
    target temperature calculating means for calculating a target temperature of air blown toward the front seat;
    air-amount determination means for determining an air-blowing amount of the blower, the air-amount determining means determines the air-blowing amount to be larger in a low temperature area where the target temperature is lower than a first predetermined temperature or in a high temperature area where the target temperature is higher than a second predetermined temperature higher than the first predetermined temperature, and determines the air-blowing amount to be smaller in a middle temperature area where the target temperature is between the first predetermined temperature and the second predetermined temperature; and air-amount correction means for increasing the air-blowing amount determined by the air-amount determination means when the rear air passage is opened by the opening/closing unit, wherein:

when the air-blowing amount determined by the air-amount determining means is larger than a predetermined amount, the air-amount correction means increases the air-blowing amount by an increase amount that is larger than that when the air-blowing amount determined by the air-amount determining means is smaller than the predetermined amount.

14. The air conditioner according to claim 13, wherein:

when the air-blowing amount determined by the air-amount determining means is smaller than a first set value, the air-amount correction means increases the air-blowing amount by an increase amount that is smaller than a first amount;

when the air-blowing amount determined by the air-amount determining means is larger than a second set value larger than the first set value, the air-amount correction means increases the air-blowing amount by an increase amount that is larger than a second amount larger than the first amount; and when the air-blowing amount determined by the air-amount determining means is between the first set value and the second set value, the air-amount correction means increases the air-blowing amount by an increase amount between the first amount and the second amount.

15. An air conditioner for a vehicle having a passenger compartment, comprising:

an air-conditioning case for defining a front air passage through which air flows toward an upper side of a front seat in the passenger compartment, and a rear air passage through which air flows toward a rear seat in the passenger compartment, the air conditioning case having a face opening through which air is blown toward an upper side of the front seat in the passenger compartment and a foot opening through which air is blown toward a lower side of the front seat in the passenger compartment at a downstream side of the front air passage;

a blower for blowing air into the passenger compartment through the front air passage and the rear air passage;

a mode door for opening and closing the face opening and the foot opening to set a face mode where air is blown from the face opening, a bi-level mode where air is blown from both the face opening and the foot opening, and a foot mode where air is blown from the foot opening;

an opening/closing unit for opening and closing the rear air passage;

mode determination means for manually setting an air outlet mode by a passenger in the passenger compartment, among a face mode where air is blown from the face opening, a bi-level mode where air is blown from the face opening and the foot opening, and a foot mode where air is blown from the foot opening; and air-amount correction means for increasing the air-blowing amount determined by the air-amount determination means when the rear air passage is opened by the opening/closing unit, wherein:

the air-amount correction means sets an increase amount of the air-blowing amount at a small value in the foot mode, sets the increase amount of the air-blowing amount at a middle value larger than the small value in the bi-level mode, and sets the increase amount of the air-blowing amount at a large value larger than the middle value in the face mode.

16. The air conditioner according to claim 1, further comprising:

an outside air temperature sensor for detecting temperature of outside air outside the passenger compartment;

an inside air temperature sensor for detecting temperature of inside air inside the passenger compartment;

a sunlight sensor for detecting a sunlight amount entering to the passenger compartment; and a temperature setting unit for setting a temperature inside the passenger compartment;

wherein the target temperature calculation means calculates the target temperature of air blown toward the front seat based on the temperature detected by the outside air temperature, the temperature detected by the inside air temperature sensor, the sunlight amount detected by the sunlight sensor, and the temperature set by the temperature setting unit.

17. The air conditioner according to claim 1, further comprising a cooling heat exchanger disposed in the air-conditioning case to cool air to be blown into the passenger compartment;

a heating heat exchanger, disposed in the air-conditioning case downstream from the cooling heat exchanger, for heating air to be blown into the passenger compartment by using a thermal fluid flowing into the heating heat exchanger as a heating source;

an air mixing door for adjusting a ratio between an air amount passing through the heating heat exchanger and an air amount bypassing the heating heat exchanger;

an evaporator temperature sensor for determining a temperature of air blown immediately from the cooling heat exchanger;

a fluid temperature sensor for detecting a temperature of the thermal fluid flowing into the heating heat exchanger; and target opening degree determining means for determining a target opening degree of the air mixing door based on the target air temperature, the temperature detected by the evaporator sensor and the temperature detected by the fluid temperature sensor.

18. The air conditioner according to claim 17, wherein:

the cooling heat exchanger is an evaporator of a refrigerant cycle; and the heating heat exchanger is a heater core which heats air using water from a vehicle engine as the heating source.

* * * * *